(12) United States Patent
Myronenko et al.

(10) Patent No.: US 8,818,105 B2
(45) Date of Patent: Aug. 26, 2014

(54) IMAGE REGISTRATION FOR IMAGE-GUIDED SURGERY

(75) Inventors: Andriy Myronenko, Sunnyvale, CA (US); Petr Jordan, Redwood City, CA (US); Jay Bailey West, Mountain View, CA (US)

(73) Assignee: Accuray Incorporated, Sunnyvale, CA (US)

( * ) Notice: Subject to any disclaimer, the term of this patent is extended or adjusted under 35 U.S.C. 154(b) by 629 days.

(21) Appl. No.: 13/183,305

(22) Filed: Jul. 14, 2011

(65) Prior Publication Data

US 2013/0016889 A1 Jan. 17, 2013

(51) Int. Cl.
*G06K 9/62* (2006.01)

(52) U.S. Cl.
USPC ............ 382/209; 382/131; 382/132; 382/294

(58) Field of Classification Search
None
See application file for complete search history.

(56) References Cited

U.S. PATENT DOCUMENTS

| | | | |
|---|---|---|---|
| 6,041,140 A * | 3/2000 | Binns et al. .................. | 382/209 |
| 7,120,276 B1 | 10/2006 | Brady et al. | |
| 7,894,649 B2 | 2/2011 | Fu et al. | |
| 7,961,838 B2 | 6/2011 | Yin | |
| 2007/0248214 A1 | 10/2007 | Smith | |
| 2008/0069453 A1* | 3/2008 | Abe et al. ...................... | 382/209 |
| 2008/0310755 A1 | 12/2008 | Jojic et al. | |
| 2010/0104158 A1 | 4/2010 | Shechtman et al. | |
| 2011/0050692 A1 | 3/2011 | Zhang et al. | |

OTHER PUBLICATIONS

Kilby et al., "The CyberKnife® Robotic Radiosurgery System in 2010", Tech. in Cancer Res. and Treatment vol. 9, No. 5, pp. 433-452 (2010).

* cited by examiner

*Primary Examiner* — Jason M Repko
*Assistant Examiner* — David Perlman
(74) *Attorney, Agent, or Firm* — Lowenstein Sandler LLP

(57) ABSTRACT

An image registration process for detecting a change in position of a surgical target, such as a tumor, within a patient is disclosed. A pre-operative model of the target and surrounding area is generated, then registered to live patient images to determine or confirm a location of the target during the course of surgery. Image registration is based on a non-iterative image processing logic that compares a similarity measure for a template of the target (generated from the pre-operative model) at one location within the live image to other locations within the live image.

26 Claims, 7 Drawing Sheets

Algorithm A

For each candidate location in the tracking region, compute a similarity value for each template patch and neighboring patch-size portions of the x-ray, then save the maximum of these nine similarity values for the patch as a patch-level similarity value

↓

Compute a template-level similarity value for the candidate location from a weighted summation of patch-level similarity values

↓

Assemble a global similarity map (FIG. 6) from the computed template-level similarity values

Algorithm A

For each candidate location in the tracking region, compute a similarity value for each template patch and neighboring patch-size portions of the x-ray, then save the maximum of these nine similarity values for the patch as a patch-level similarity value

↓

Compute a template-level similarity value for the candidate location from a weighted summation of patch-level similarity values

↓

Assemble a global similarity map (FIG. 6) from the computed template-level similarity values

FIG. 5A

Algorithm B

For each template patch, compute a patch-level similarity value for every candidate location to create patch-level similarity maps

↓

For each patch-level similarity map, compute neighboring patch-level similarity values for every candidate location in the patch-level similarity map and retain the maximum of the patch-level similarity values as final patch-level similarity maps

↓

Combine the final patch-level similarity maps according to the relative positions of the patches in the template to create a global similarity map (FIG. 6).

IMAGE REGISTRATION FOR IMAGE-GUIDED SURGERY

FIELD OF THE INVENTION

The disclosure relates generally to image registration, and in particular, but not exclusively to registering a pre-operative image of a patient with a live image of the patient.

BACKGROUND OF THE INVENTION

Image guided radiation therapy (IGRT) uses images, either set-up images obtained just prior to radiation delivery or intra-treatment images, to identify the location of a treatment target (either directly or relative to a known structure within the body) within a treatment room reference frame relative to a treatment planning image reference frame. A physician typically diagnoses a lesion using a 3D image—e.g., MRI, PET, CT or ultrasound—and determines whether radiation is indicated for treatment. The physician then uses the CT image (sometimes fused with an MR image), or obtains a fresh CT image to create a treatment plan, this CT image sometimes referred to as the treatment planning image. The treatment planning image has its own reference frame defined, for example and without limitation, by the person creating the treatment plan. In IGRT challenges arise when attempting to locate within the body a target region (or a structure) that moves, either just prior to, or during the course of radiation treatment, from its location within the body when the treatment planning image was acquired.

Image registration provides the ability to locate a target region within the body by comparing the image content between two or more images. As used herein, "registration" of medical images refers to the determination of a mathematical relationship between corresponding anatomical or other features (e.g. fiducials) appearing in those medical images. Registration can include, but is not limited to, the determination of one or more spatial, alignment or intrafraction transformations that, when applied to one or both of the medical images, would cause an overlay of the corresponding anatomical features. The spatial or alignment or intrafraction transformations can include rigid-body transformations and/or deformable transformations and can, if the medical images are from different coordinate systems or reference frames, account for differences in those coordinate systems or reference frames. For cases in which the medical images are not acquired using the same imaging system and are not acquired at the same time, the registration process can include, but is not limited to, the determination of a first transformation that accounts for differences between the imaging modalities, imaging geometries, and/or frames of reference of the different imaging systems, together with the determination of a second transformation that accounts for underlying anatomical differences in the body part that may have taken place (e.g., positioning differences, overall movement, relative movement between different structures within the body part, overall deformations, localized deformations within the body part, and so forth) between acquisition times. The term alignment transformation refers herein to a transformation between a first coordinate system (for example and not by way of limitation a planning image coordinate system of a patient) and a second coordinate system (a treatment room coordinate system) whereby the alignment transformation determines the location of a target in the second coordinate system relative to the first coordinate system, for example and not by way of limitation at the time of patient setup prior to commencement of the treatment fraction. The term intrafraction transformation refers herein to a transformation between the first coordinate system and the second coordinate system whereby the intrafraction transformation determines the location of the target in the first coordinate system relative to the second coordinate system following commencement of the procedure, for example and not by way of limitation during the treatment fraction.

Knowing where the target is located in the treatment room is important to safely delivering radiation to the target while minimizing delivery to healthy tissue surrounding the target. Accuray's CyberKnife® System tracks targets by comparing two-dimensional (2D) treatment room x-ray images of the patient to 2D digitally reconstructed radiographs (DRRs) derived from three dimensional (3D) pre-treatment imaging data. The pre-treatment imaging data may be computed tomography (CT) data, magnetic resonance imaging (MRI) data, positron emission tomography (PET) data or 3D rotational angiography (3DRA), for example. The treatment room x-ray imaging system of CyberKnife® is stereoscopic, producing images of the patient from two or more different points of view (e.g., orthogonal). Other mechanisms of locating the target are well known to the skilled artisan. For example and not by way of limitation, single image location and tracking is known as described in provisional application 61/408,511, and cone beam CT target location for patient set up on gantry radiation therapy devices is known as described in U.S. patent application Ser. No. 13/156,285.

A DRR is a synthetic x-ray image generated by casting (mathematically projecting) rays through the 3D imaging data, simulating the geometry of the in-treatment x-ray imaging system. The resulting DRR then has the same scale and pose as the treatment room x-ray imaging system, and can be compared with images from the treatment room x-ray imaging system to determine the location of the patient, or the location of the treatment target within the patient relevant to the treatment planning image reference frame. To generate a DRR, the 3D imaging data is divided into voxels (volume elements) and each voxel is assigned an attenuation (loss) value derived from the 3D imaging data. The relative intensity of each pixel in a DRR is then the summation of the voxel losses for each ray projected through the 3D image.

Image registration in general involves computation of similarity values or, equivalently, difference values (e.g., cross correlation, entropy, mutual information, gradient correlation, pattern intensity, gradient difference, image intensity gradients) that are evaluated to determine a spatial transformation between a target's location in a planning room image and a target's location in a treatment room image. In particular, CyberKnife® registers two orthogonal treatment room x-ray images to two corresponding sets of DRRs (one set for each pose of the treatment room x-ray system) to obtain a 2D-3D spatial transformation between the x-ray images and a planning CT.

There is a need to improve on image registration methods to increase the accuracy and computational efficiency in locating a target in one or more images, and thereby more accurately and efficiently determine the spatial transformation between the target's location in a treatment room reference frame relative to a treatment planning image reference frame.

SUMMARY OF THE INVENTION

The invention provides a method and apparatus for locating the position of a target in a first reference frame represented by a first image, e.g., a live x-ray acquired from a system in a treatment room reference frame, relative to a second reference frame represented by a template of patches selected from a second image, e.g., a DRR, where the location and shape of the target are known or defined in the second reference frame. The template patches are selected based on their perceived ability to distinguish characteristics of the target in the first image from nearby structures. The target's location in the first image is found by computing similarity values between each of several hypothetical, or candidate locations for the target and the template patches. A maximum of similarity values indicates the location of the target in the first image.

A similarity value for a candidate location is based on a combination of similarity values for each template patch at the candidate location. "Similarity values" or "similarity measures" are numbers that reflect the degree to which two images are similar to each other. For example, a cross-correlation or combination of several cross-correlations between two images can be used to compute a similarity value. This combination of similarity values may be weighted according to the relative importance of the informational content about the target among the template patches. In one embodiment, the similarity value for a candidate location, or template-level similarity value, is a weighted sum of the similarity values of the template patches, or patch-level similarity values, at the candidate location. For example, the weighting applied can be a standard deviation of the pixel values in the patches. As such, patches with a higher standard deviation are given greater weight when computing the template-level similarity value. Other numerical combinations and/or weightings of patch-level similarity values may be used to compute template-level similarity values.

One embodiment for locating a target proceeds by first assembling patch-level similarity maps over a tracking region for each patch. Each patch-level similarity map contains a similarity value for the patch at each of the candidate locations considered in the image. The patch-level similarity maps are then combined, according to their spatial relationship in the template, to produce a global similarity map. The combination of the patch-level similarity maps may be a weighted sum of the similarity values in each patch-level similarity map.

In an alternative embodiment for locating a target, a template-level similarity value for a candidate location is determined before proceeding to the next candidate location. Thus, in this alternative method, patch-level similarity maps are not used. Instead, the candidate locations in the global similarity map are populated with template-level similarity values as the template is moved from one candidate location to another.

One use for the invention is in the context of image-guided surgery. A pre-operative model of a treatment target, e.g., a tumor body, and the surrounding area is generated then registered to live patient images to determine or confirm a location of the target during the course of surgery. The image registration step may be performed using either of the aforementioned methods to locate the tumor body in the live patient image, e.g., an x-ray. Methods according to the invention may also be used to perform initial alignment of the patient, or to detect motion of the patient during treatment.

When there are multiple imaging devices, e.g., X-ray imagers, in the treatment room, and the relative geometry of the multiple imaging devices is known, it may be possible to exploit this known relative geometry. For example, when multiple images having a shared axis (i.e., same coordinate location for the target) are registered to locate a target, the registered images may be compared to confirm the location of the target by exploiting this shared-axis requirement. This shared axis feature may be practiced with search methods disclosed herein or using other suitably chosen image registration techniques, such as those described in US 2008/0130825.

Similarity values as described above may be computed using a cross-correlation, entropy, mutual information, gradient correlation, pattern intensity, gradient difference, or image intensity gradients methods. The computed values may be normalized so that the resulting similarity value is a number ranging between 0 and 1 or −1 and 1.

INCORPORATION BY REFERENCE

All publications and patent applications mentioned in the present specification are herein incorporated by reference to the same extent as if each individual publication or patent application was specifically and individually indicated to be incorporated by reference. To the extent there are any inconsistent usages of words and/or phrases between an incorporated publication or patent and the present specification, these words and/or phrases will have a meaning that is consistent with the manner in which they are used in the present specification.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 5A and 5B are flow diagrams for two search methods for finding the target in FIG. 1B using the selected patches.

DETAILED DESCRIPTION OF EMBODIMENTS

For purposes of this disclosure, the following meanings apply:

A "non-iterative" process or method means a process or method that finds a solution using a finite sequence of operations, regardless of the input. An "iterative" process or method, in contrast, is one where there is a sequence of improving approximate solutions that are terminated when a proscribed convergence criteria is met.

An "image" refers to either a two-dimensional (2D) or three-dimensional (3D) representation of a thing. A rendered volumetric model of patient anatomy produced from CT imaging data is an example of a 3D image of a patient. An x-ray of a patient is an example of a 2D image of a patient.

A "patch" refers to a portion of a 2D or 3D image. A patch for a 2D image may be rectangular, square, polygonal or non-polygonal and may encompass several pixels within a particular area of the image. A patch for a 3D image may encompass one or more discreet volumetric elements, or voxels, and may also take various shapes.

Image registration is often used to track the motion of a target, such as a tumor, during image-guided surgery. In a typical target tracking situation skeletal structures (e.g., ribs), soft tissue structures (e.g., heart), and/or image artifacts obscure the view of the target in a live or in-treatment image (e.g., x-ray, tomosynthetic, or Cone Beam Computed Tomography (CBCT) image). An obscured view of the target makes it more difficult to accurately, quickly and precisely register the live image to a reference image (e.g., a DRR from a planning CT, or directly to a planning CT) to thereby track motion of the target.

Patches can be used as guides for more quickly and robustly registering a treatment room image acquired in the treatment room reference frame (e.g., 2D x-ray image or 3D CBCT or tomosynthetic image) to a reference image in the treatment planning reference frame (e.g., DRR). In this context, patches of the target can be used to compute similarity values or, equivalently, difference values (e.g., cross correlation, entropy, mutual information, gradient correlation, pattern intensity, gradient difference, image intensity gradients) to locate the target in the x-ray image, which information is then used to register the treatment room image to the reference image and compute the location of the target within a patient treatment room space. The skilled artisan has knowledge of other registration techniques for tracking and/or locating a target, some of which are disclosed in U.S. Publication Nos. 20060274885 and 20090087124.

Figure 1A:
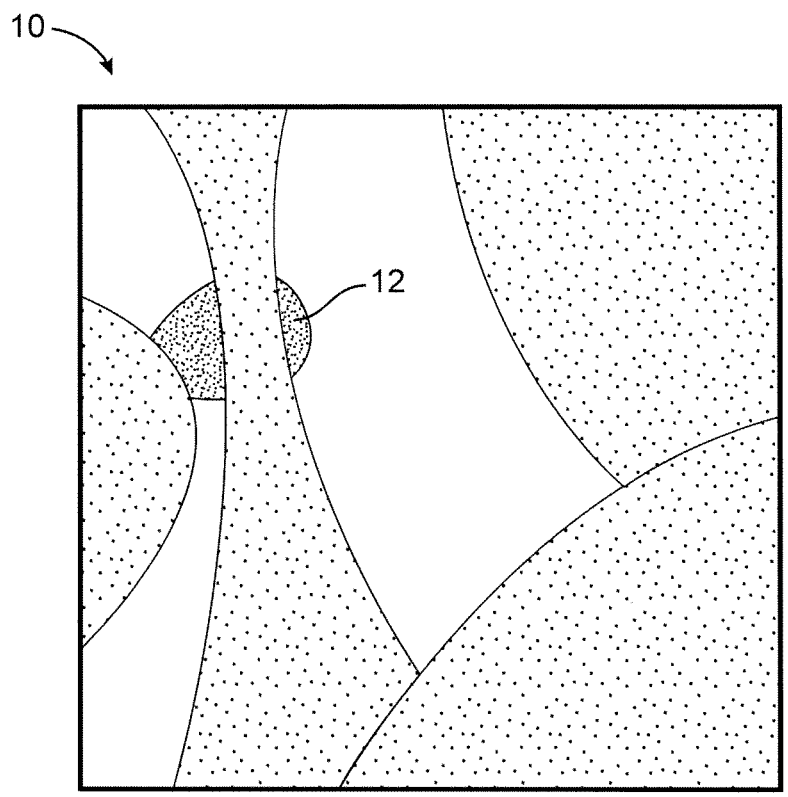
FIGS. 1A and 1B are two images of a target. The target's location is known in FIG. 1A, but not in FIG. 1B. For example, FIG. 1A can be a digitally reconstructed radiograph (DRR) of the target and FIG. 1B can be a live x-ray image of the target.
Figure 1B:
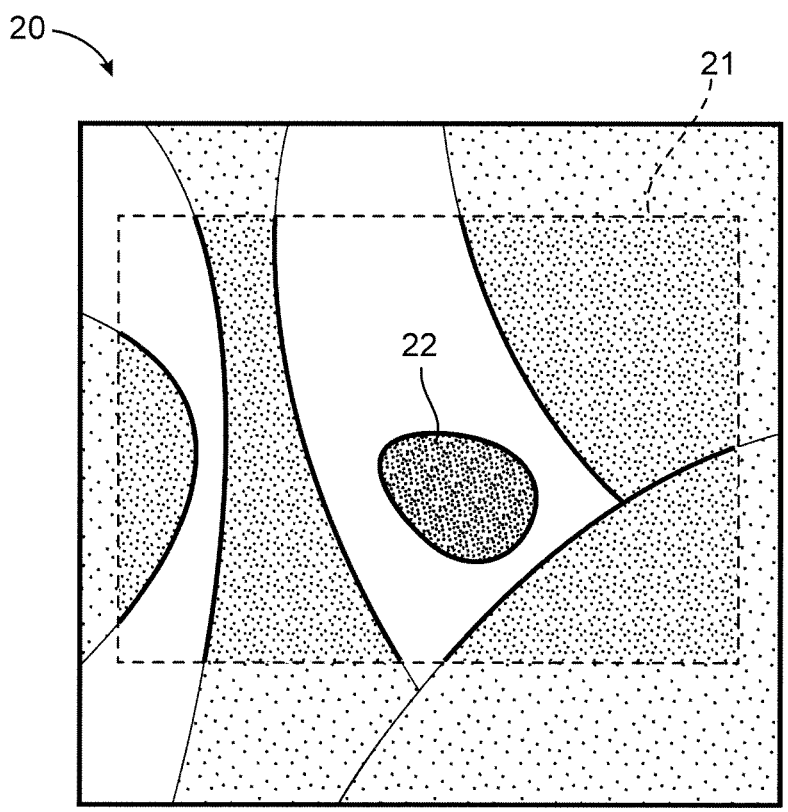

Referring to FIG. 1, a target 12 location, shape and size within a first 2D (e.g., DRR) or 3D (e.g., CT) image 10 is precisely known, such as in a reference planning image or a DRR from the planning image by virtue of, for example, the user contouring the planning image as will be appreciated by the skilled artisan. However, the location of target 12 in a corresponding second live 2D (e.g. x-ray) or 3D (e.g., tomosynthetic or CBCT) image 20 is not known, although believed to lie somewhere within a tracking region 21 of the second image 20. The first image 10 and second image 20 are two representations of the same thing (e.g., the first image 10 is a 2D DRR of a portion of a patient while image 20 is an x-ray image of the portion of the patient taken from approximately the same pose as the DRR) at just before or during treatment delivery, except that in image 20 target 22 has moved from its previous known location. Additionally, the target may have undergone a rotation or deformation in three-dimensional space, in addition to a translation in the plane of the image 20. It is desirable to locate target 22 in image 20 using the known information about target 12 from image 10.

To this end, the location of target 22 in image 20 is found by a process that compares selected image patches for target 12 from first image 10 against corresponding image portions in image 20 for several hypothetical or candidate (target) locations over the tracking region 21. The patches selected for this comparison are those patches that are believed will most closely match features of target 22 viewable in image 20.

After selecting patches according to this criteria, similarity values are computed between the selected patches and the respective image 20 portions for each of the candidate locations. The most probable location of the target 22 in the image 20 is the location where a maximum of the similarity values exists. The location of the maximum provides the information needed to compute a spatial transformation between the target's location in the treatment room image relative to the target's location in the planning image.

Patch Selection

A patch selection process for selecting patches from a DRR that will be used to locate a treatment target in an x-ray of a patient will now be described. In this example, therefore, the image 10 is the DRR and the image 20 is the x-ray (live) image. A 3D image of a volume of interest in the patient is used to generate the DRR, as is well known. This 3D image contains detailed volumetric and attenuation characteristics of the target 12 and surrounding structure. Computed tomography (CT), magnetic resolution imaging (MRI), positron emission tomography (PET) or ultrasound imaging are examples of modalities used to acquire data for the 3D image.

In a preferred embodiment, two DRRs are used to select patches for locating target 22 in the x-ray. The first DRR is image 10, which includes images of all of the structure that would appear in the patient x-ray including target 12. That is, the DRR corresponding to image 10 reconstructs the gray-scale images for the various structures in the patient as they would appear in the x-ray. The second DRR, by contrast, generates a gray-scale image for only target 12, substantially excluding the other structures as they would appear in the x-ray. This DRR may be generated from the same 3D image data used to generate the first DRR (for example, the second DRR may be generated from a 3D image data where all radiation attenuation coefficients other than those for target 12 are set equal to zero). As explained below, selection of patches for comparing the DRR with the x-ray is based on computed similarity values between patches in the first and second DRR.

Figure 2A:
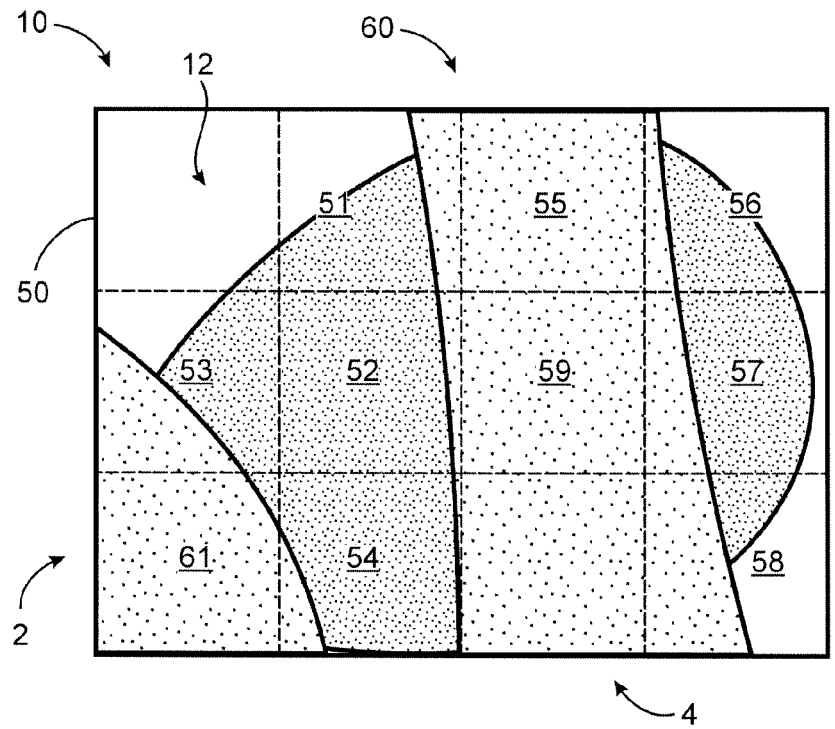
FIG. 2A is a template for the target that was extracted from FIG. 1A.
Figure 2B:
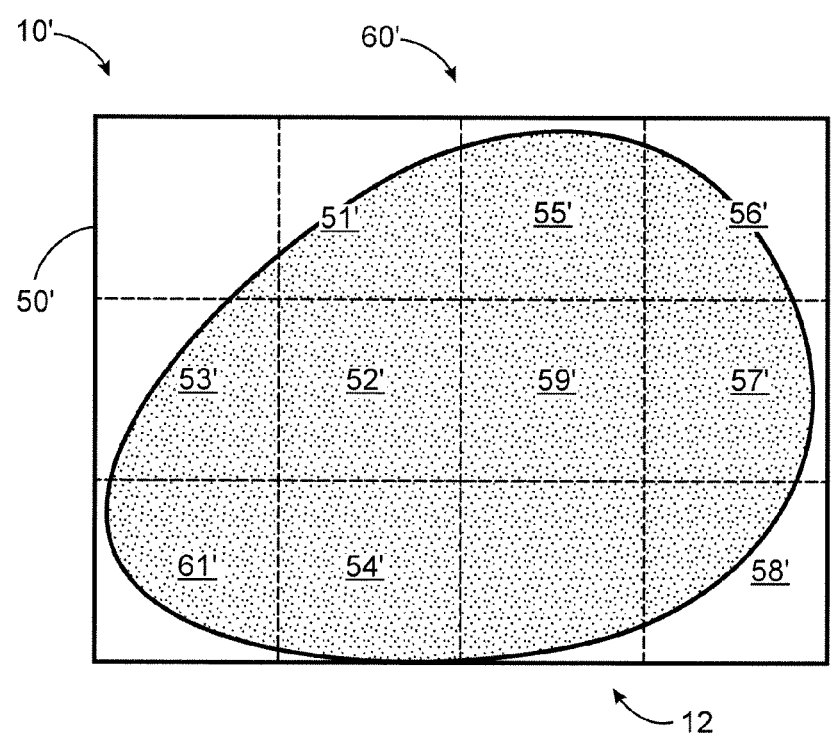
FIG. 2B is a second template for the target that only shows the target.

Referring to FIG. 2A, a template 50 for target 12 portion of image 10 is extracted from the first DRR. Template 50 is subdivided into candidate patches 60. Each candidate patch has a predetermined size and shape, e.g., 13×13 pixels, and partially overlaps adjacent patches by, e.g., 7 pixels on each side (by having patches overlap each other, edges of target 12 that might fall on the boundary of a patch are not ignored when computing similarity values for patches, such as in the case of the edge of target 12 that coincides with the lower boundary of patch 54 in FIG. 2A). A similar template 50' subdivided into reference patches 60' is extracted from the second DRR, as shown in FIG. 2B. FIGS. 2A-2B show templates 50, 50' each subdivided into 12 patches of equal size, though different size patches may be used. Target 12 image in the first DRR, FIG. 2A, is partially obscured by structure 2 and 4, which could be skeletal structure or soft tissue that appears for this view of the patient anatomy. Only target 12 appears in the second DRR.

Similarity values are computed between each patch in template 50 and the corresponding patch in template 50' to determine which of patches 60 in template 50 should be used, or not used, to locate target 22 in the x-ray. That is, a similarity value is computed between patch 61 and patch 61', a similarity value is computed between patch 51 and patch 51', etc. A similarity value may be a normalized cross-correlation of two patches. The patches from template 50 having the highest similarity values with respect to template 50' identify those patches that best describe image features of the target. These patches are then used to locate target 22 in the x-ray. The patch selection criteria may be a minimum correlation value for a patch or the top "n" patches may be used to find target 22 in the x-ray. Alternatively, the patch selection criteria may be to exclude any patch that negatively correlates with the respective patch from template 50'. The criterion selected for a particular application may be based on one or more factors. For example, patches may be selected based on empirical data, e.g., the minimum number of patches needed to consistently locate a target for different locations of the target within a patient, the size of the target and/or distinguishing features of the target, the size of a patch and/or the pixel or voxel size, the desired computational speed (the more patches used, the more machine computations needed for the same patch size).

Figure 4:
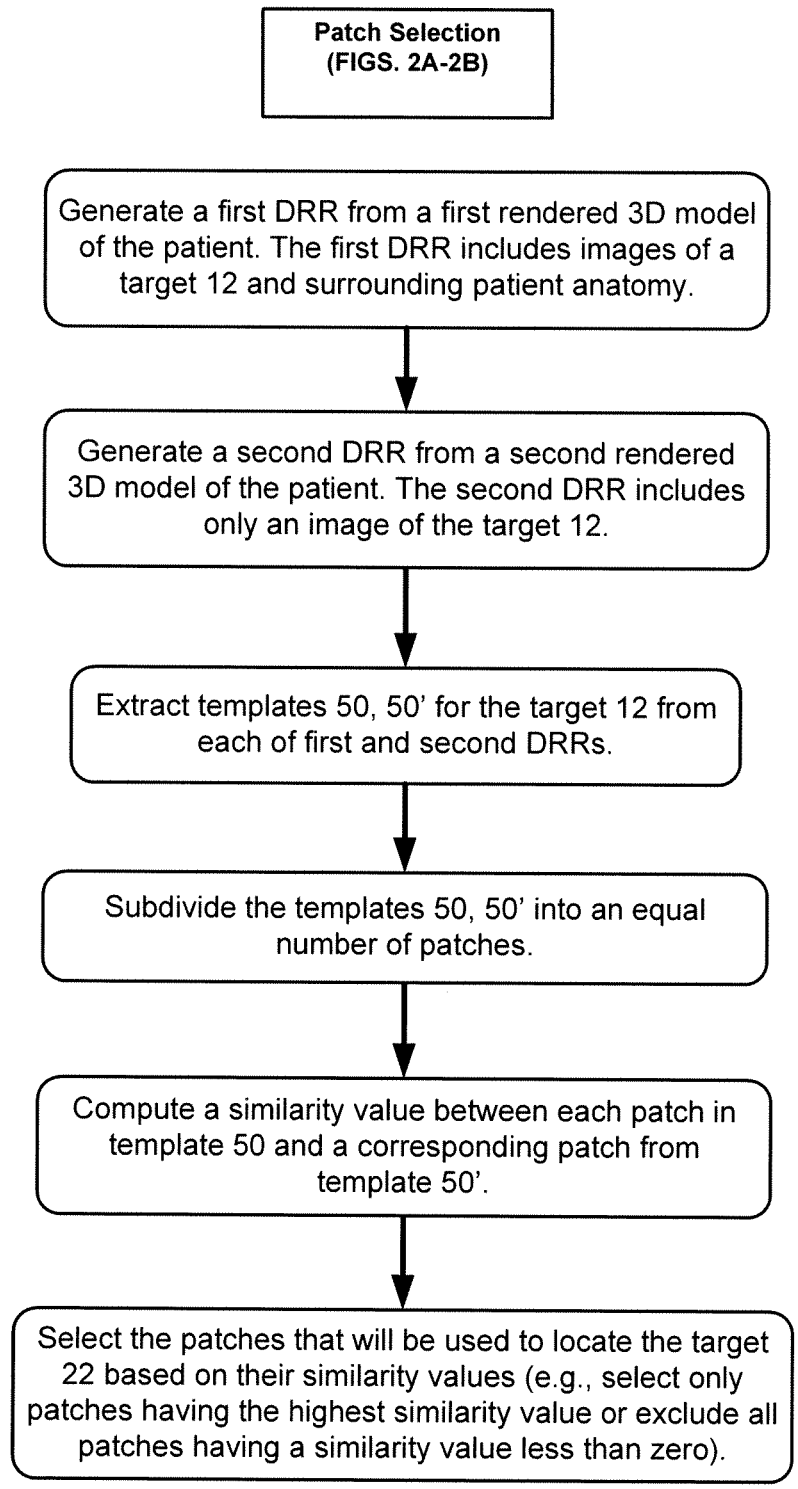
FIG. 4 is a flow diagram of a process for selecting patches from the template of FIG. 2A. The selected patches are used to find the target in FIG. 1B.

The patches in template 50 having the highest similarity values are patches 51, 52, 53, 54, 56, 57 and 58. These patches mostly contain image features of target 12 (patches 52 and 54) and/or distinguishing edges of the target (patches 51, 53, 56, 57 and 58) rather than structure 2 and 4. Patches that contain mostly images of structure 2 or 4 (e.g. patch 55, 59 and 61) will more often hinder, rather than help the locating of target 22 in the x-ray as in, for example, situations where target 22 has moved relative to structure 2 and 4 in the x-ray, e.g., by respiratory-induced motion. By using the patch selection process just described, patches that contain mostly images of structure 2 and 4 are revealed by low or negative similarity values with the corresponding patch in template 50'. Unhelpful patches can therefore be easily excluded. The foregoing patch selection process is summarized in the flow diagram of FIG. 4.

A patch selection process need not utilize two DRR images, i.e., the first DRR showing the target and surrounding structure and the second DRR showing only the target, when selecting patches. Alternatively, patches may be selected using a single DRR. For example, a clinician selects patches using only the displayed image of the first DRR on a computer monitor. Using an input device, such as a mouse, keyboard or touch screen interface, the clinician indicates the area(s) in the first DRR that will be used as patches. A computer then partitions these area(s) into patches according to a user-defined patch size, e.g., 9×9 pixel size patches, using well known image partitioning software. Thus, in this example a second DRR image showing only the target is not needed since the clinician is, essentially, manually selecting patches from a display of the first DRR on a computer monitor.

The Search Process

A process for finding target 22 in the x-ray using the patches selected from DRR template 50 (hereinafter "template patches") will now be described with reference to FIGS. 3A and 3B. Frequent reference will therefore again be made to a 2D image registration example. It will be understood that a similar search process can be implemented for 3D image registration in view of the following disclosure. It will also be understood that an x-ray image may be obtained from any number of known imaging modalities, e.g., PET, CT and CBCT.

Figure 3A:
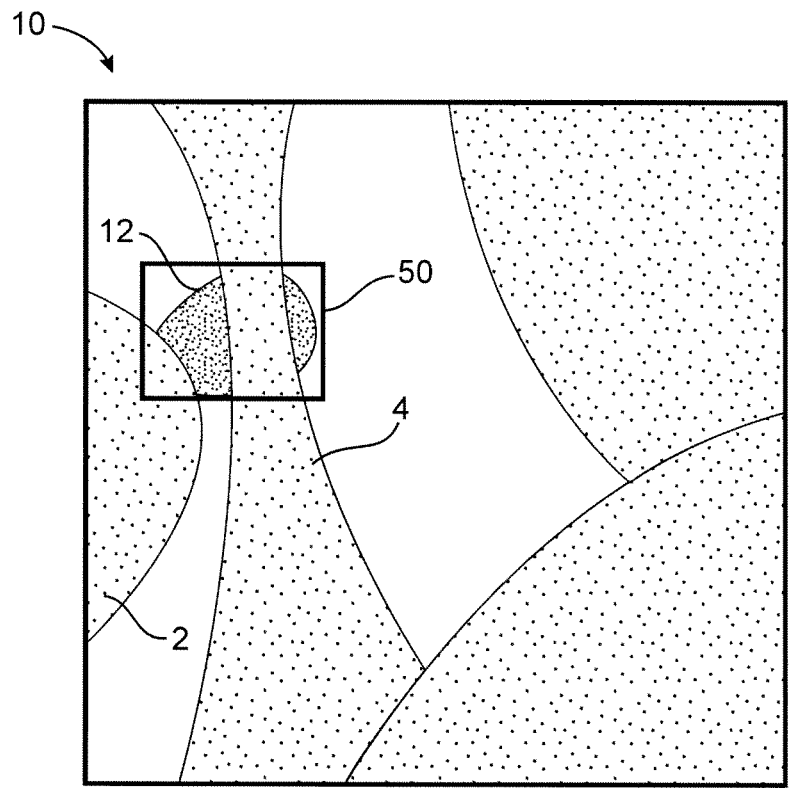
FIGS. 3A and 3B are annotated versions of FIGS. 1A and 1B, respectively, showing the extracted template of FIG. 2A and examples of hypothetical or candidate locations for the target.
Figure 3B:
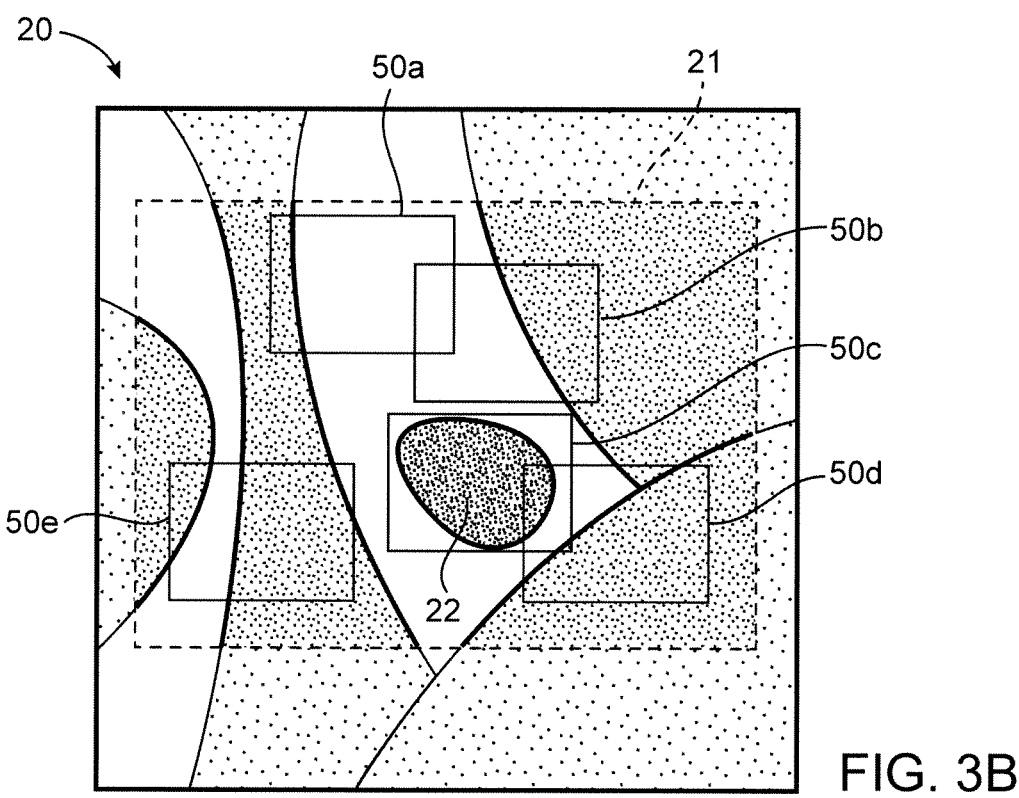

FIG. 3A and FIG. 3B are annotated versions of FIG. 1A and FIG. 18, respectively. FIG. 3A shows template 50 extracted from DRR image 10. The search for target 22 proceeds by comparing the image data in template 50, i.e., the template patches, with the corresponding image data found at each of several similarly sized locations, e.g., locations 50a, 50b, 50c, 50d, and 50e in FIG. 3B, within tracking region 21 of image 20. The objective is to find target 22 in one of these locations using the template patches as guides; or to find the location having image data that is most similar, in the aggregate, to the image data in the template patches.

Each of locations 50a, 50b, 50c, 50d, and 50e in FIG. 3B may be thought of as candidate locations for target 22, which are individually evaluated or tested by computing a similarity value between the image data contained therein and the image data in the template. This similarity value or more precisely "template-level" similarity value, which is based on a combination of the similarity values for the template patches, is computed for each candidate location. The maximum template-level similarity value over all candidate locations (i.e., the candidate location having the most similar image data as the template) is then the expected location of target 22 in the x-ray. Location 50c in FIG. 3B, therefore, should have the maximum template-level similarity value since target 22 is found at location 50c.

Figure 6:
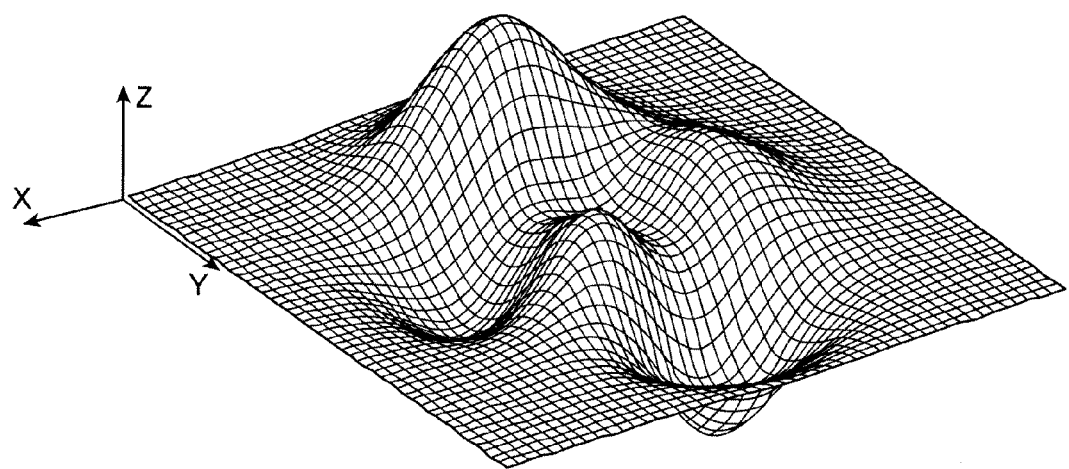
FIG. 6 is a three-dimensional contour map showing template-level similarity values that were computed using either of the algorithms of FIGS. 5A and 5B.

After computing all template-level similarity values for each candidate location, a global similarity map may be generated as in FIG. 6. The coordinates "X" and "Y" refer to the candidate locations over tracking region 21. These coordinates may correspond to pixel coordinates in a digital image during 2D registration (similarly, for 3D registration coordinates may refer to voxel coordinates in a 3D image and each candidate location may be separated by one or more voxel coordinates). Candidate locations may be separated by one or more pixels, the width of a patch or a pre-defined block size that is the same or differently sized from a patch. In the 2D registration examples described below, candidate locations are separated by a pixel distance or, stated somewhat differently, every pixel location in the tracking region is evaluated as a hypothetical or candidate location for the target. Thus, in this example the global similarity map of FIG. 6 would have dimensions equal to the number of pixels in the tracking region (e.g., 100×100 size global similarity map for 100 pixels in the tracking region). The "Z" coordinates of the global similarity map of FIG. 6 represent the magnitudes of the template-level similarity values that were computed at each respective candidate location.

Exemplary Algorithms

The above described process is implemented algorithmically in one of two ways. Each algorithm (referred to below as "Algorithm A" and "Algorithm B") is non-iterative and generates the same collection of template-level similarity values that populate the global similarity map, but use a different approach to compute these template-level similarity values. For both algorithms candidate locations may be spaced from each other by one or more pixels. For example, with a 13×13 pixel patch size, therefore, a candidate location may be offset by one or more pixels from each of the eight nearest surrounding candidate locations—i.e., location to the right, left, above, below and along the four diagonals. Moreover, the size of each candidate location can be the same as the template size, e.g., 3×4 patch widths (FIG. 2A).

The following description refers to a DRR that is being registered with an x-ray image for purposes of describing aspects of each algorithm. However, it will be understood that either algorithm may be readily used in other image registration applications, and may be used for 2D or 3D image registration. The algorithms may therefore be used to locate a target in a 3D image (e.g., a tomosynthetic or CBCT image) using a template containing 3D patches. It will be further understood that the present invention is not limited to x-ray imaging modalities. For example and not by way of limitation the present invention may also be used to register images from ultrasound or magnetic resonance.

Algorithm A

Algorithm A computes the template-level similarity value for a candidate location before moving to the next candidate location. As mentioned above, a template-level similarity value refers to a similarity value produced from the combined (e.g., summed) similarity values of the template patches (a similarity value for an individual patch will be called a "patch-level similarity value"). After computing the template-level similarity value at a first candidate location, the template is moved to a second candidate location to compute its template-level similarity value. The template is then moved to a third candidate location to compute its template-level similarity value, and so on until template-level similarity values are computed for all candidate locations in the tracking region. One embodiment of the Algorithm A steps are summarized in FIG. 5A. Other embodiments are also disclosed.

A patch-level similarity value is computed using a normalized cross-correlation between the image data in the patch and the image data corresponding to the patches' relative location to the candidate location. A normalized cross-correlation between the pixel values in the patch to the corresponding pixel values in the x-ray corresponding to the patch's location is computed. This normalized cross-correlation (a scalar) between the pixel values in a template patch, f(x,y), and the corresponding pixel values in x-ray image, t(x,y), is expressed in (Eq. 1).

$$\Sigma[(f(x,y)-F)(t(x,y)-T)](\delta_f \delta_t)^{-1} \quad \text{(Eq. 1)}$$

Where the summation is over all pixels, x and y are the pixel coordinates, F and T is the average values of f(x,y) and t(x,y), respectively, and $\delta_f$ and $\delta_t$ are the standard deviations of f(x,y) and t(x,y), respectively. A normalized cross-correlation for patch-level similarity values produces correlation values that range between −1 and 1. For example and not by way of limitation, an entropy, mutual information, gradient correlation, pattern intensity, gradient difference, or image intensity gradient method may alternatively be used to compute patch-level similarity values.

As mentioned earlier, the target in the x-ray image may have undergone a rotation in three-dimensional space and/or slight deformations when it moved from its previous location in the reference image (e.g., DRR). Such changes can appear in the plane of the x-ray image as changes to the target's shape. To account for a changed shape, patch-level similarity values are computed both for the patch's location in the x-ray image and neighboring portions of this location. By evaluating neighboring or immediately adjacent portions of the x-ray image, in addition to the patch's location in the image, variations in the target's shape can be taken into consideration, or compensated for, when the template patches are evaluated at a candidate location. In one embodiment similarity values using a normalized cross-correlation are computed for surrounding neighboring patch-size portions and the maximum of these computed similarity values is saved, or filtered out as the patch-level similarity value. Thus, for each patch in the template, this embodiment computes nine (9) normalized cross-correlations: correlations: between the patch and its location in the x-ray image, and between the patch and the patch-size image portion that is located directly above, below, to the right, to the left and at each of the four corners of the patch location in the x-ray image. The maximum of these similarity values is saved as the patch-level similarity value at the candidate location. In essence, a "MAX-filter" similarity value or maximum of the similarity values is filtered out as the similarity value for a patch.

In alternative embodiments of the MAX-filter similarity value, another statistic may be generated from the combined similarity values at the patch's location and one or more neighboring locations in the x-ray image and used as a patch-level similarity value. For example, or in addition, a mean or median similarity value may be generated. A patch-level similarity value that takes into account changes in the target's shape may also be based on an entropy, mutual information, gradient correlation, pattern intensity, gradient difference, or image intensity gradient method for computing similarity values.

The template-level similarity measure is based on a combination of the patch-level similarity values for the candidate location, e.g., a summation of the patch-level similarity values. To increase accuracy in distinguishing features of the target from surrounding structure, a weighting is applied to patches based on their relative importance in distinguishing the target from its surroundings in the x-ray; that is, a weighting is associated with a patch based on the relative significance of the image information in the patch. For example, referring to FIG. 2A, selected patches 51, 53, 56, 57 and 58 contain an edge of target 12, whereas selected patches 52 and 54 show mostly the target's interior. Edge information is more informative of the target's true location in the x-ray image since there is a more noticeable contrast between the target and its surroundings in the x-ray image at an edge. These differences in patch content can be reflected in the standard deviation of the pixel values, such as a standard deviation of image intensities for the patch, which is computed from pixel values associated with the patch. Utilizing a standard-deviation weighting for patches, therefore, the normalized template-level similarity value (TSV) for a candidate location is $$TSV = \Sigma \delta_i PSV_i [\Sigma \delta_i]^{-1}, i=1 \ldots m \quad \text{(Eq. 2)}$$

Where the summations are over "m" template patches (e.g., m=7 for the selected patches from template 50 in FIG. 2A), $PSV_i$ is a previously computed patch-level similarity value ("PSV") for the $i^{th}$ patch and $\delta_i$ the standard deviation for the $i^{th}$ patch. The TSV is a normalized similarity value for the candidate location varying between −1 and 1. Alternatively, another measure such as entropy of the patches can be used to create the values for the weights. Further, instead of a weighted summation, a threshold may instead be used so that the weights of all patches with an importance less than a given value are set to zero. PSVs may also be combined as a weighted product or combined probability measure, such as in the case of entropy where the sum may take the form of $\Sigma PSV_i \log PSV_i$, i=1 . . . m ($0 < PSV_i < 1$). Moreover, the weights assigned to each PSV may be a standard deviation, entropy, gradient norm (e.g. total variation), max gradient value, and other moments of patch intensity values.

One problem that can arise in connection with image recognition is the mistaking of a local maximum with a global maximum of a similarity measure. This misidentification of a maximum similarity value is often caused by local changes in relative image intensity values. For example, the relative image intensities between the DRR image and the x-ray image at a first candidate location may be slightly different from the relative image intensities at a second candidate location. As such, the template-level similarity value at the first candidate location may be mistaken as the maximum when in fact the maximum occurs at the second candidate location. This effect is dealt with, for example, by computing normalized cross-correlation values at the patch level, and a normalized template-level similarity value. A normalized entropy, mutual information, gradient correlation, pattern intensity, gradient difference, or image intensity gradient method may be used in place of cross-correlation.

Algorithm B

Algorithm B produces the same template-level similarity values for the global similarity map as in Algorithm A. However, rather than computing a template-level similarity value for a candidate location before moving to the next candidate location, Algorithm B computes a similarity value for a template patch at each candidate location to produce a similarity map over all candidate locations for that template patch. Similar "patch-level similarity maps" are assembled for the remaining template patches. After a patch-level similarity map has been assembled for each of the template patches, the patch-level similarity maps are combined to produce the global similarity map. One embodiment of the Algorithm B steps is summarized in FIG. 5B. Other embodiments are also disclosed.

The patch-level similarity values that create the patch-level similarity maps are computed with Eq. 1, above, using the patch and the corresponding image intensity values at a candidate location. Only this normalized cross-correlation, or another suitable similarity measure, is computed at the candidate location. The same patch-level similarity value is then computed for the next candidate location, and so on, until a patch-level similarity value has been computed for all candidate locations. These similarity values are saved in the patch-level similarity map for the patch.

In Algorithm A rotation or deformation of the target was accounted for by computing similarity values for the patch location and the eight patch-size portions of the x-ray image surrounding the patch location. The same computation is performed in Algorithm B using the information in the patch-level similarity maps.

Each patch-level similarity map contains similarity values for all candidate locations, e.g., a similarity value for each pixel coordinate when candidate locations are considered for each pixel coordinate in the tracking region. Thus, the similarity values for patch-size images located directly above, below, to the right, to the left and at the four corners of a patch location that were computed in Algorithm A are already contained in the previously assembled patch-level similarity map. Changes to the target shape are accounted for in Algorithm B by saving the maximum of the corresponding nine patch-level similarity values for each of the patch's locations, i.e., the maximum of the similarity value at the patch's location and the similarity values for the locations directly above, below, to the right, to the left and at the four corners, for each of the patch's locations in the patch-level similarity map. A "final" patch-level similarity map contains this maximum, or MAX-filter of the similarity values at each candidate location for the patch. Alternatively, or in addition, a mean or median similarity value (as compared to a maximum similarity value) may be saved in the final patch-level similarity map.

The global similarity map is a weighted summation of the final patch-level similarity maps. The sum is normalized (as in Algorithm A) to produce template-level similarity values ranging between −1 and 1. The summation is made according to the spatial relationship among the patches in the template. For example, referring again to FIG. 2A, a weighted and normalized sum of patch 51 and patch 54 similarity values at a candidate location, or $PLSM_{51+54}(i, j)$, may be expressed as $$PLSM_{51+54}(i,j)=[\delta_{51}\delta_{54}]^{-1}(\delta_{51}PLSM_{51}(i,j)+\delta_{54}PLSM_{54}(i,j-2))$$ (Eq. 3)

Where $PLSM_{51}(i, j)$ and $PLSM_{54}(i, j)$ are patch-level similarity values at candidate location i, j from the patch 51 map and patch 54 map, respectively; and $\delta_{51}$ and $\delta_{54}$ are the standard deviations for patch 51 and patch 54, respectively.

Since patch 54 is two patch widths below patch 51 (FIG. 2A), a value at a location (i, j−2) in $PLSM_{54}$ is added to the value at location (i, j) in $PLSM_{51}$. Similarly, a value at location i, j in the final patch-level similarity map for patch 57, $PLSM_{57}(i, j)$ is added to $PLSM_{51+54}(i, j)$ to create $PLSM_{51+54+57}(i, j)$ by adding $PLSM_{57}(i+2, j-1)$ to $PLSM_{51+54}(i, j)$.

For 3D image registration similarity values are computed across three dimensions, rather than two dimensions as described above. Thus, for example, a 3D MAX-filter of the similarity values computes similarity values for each of a 3D patch-size image portion surrounding a patch in three-dimensional space. And template-level similarity values are computed for template locations in three-dimensional space. The resulting global similarity map, therefore, can be thought of as a four-dimensional map of template-level similarity values, in contrast to the three-dimensional contour map produced for a 2D image registration, e.g., as shown in FIG. 6.

Image-Guided Surgery

Image registration processes according to the present disclosure are particularly useful in registering a pre-operative DRR with a live x-ray image of a patient. This type of image registration is often used to assist with locating, or tracking the body of a tumor within a patient during radiation treatment. Depending on the treatment approach, DRR images are registered against one or more live x-rays of the patient.

When the treating radiation source is moved in three dimensional space to delivery fractional doses, DRR images are registered with more than one X-ray image. The image-guided, robotic-based radiation treatment CyberKnife System developed by Accu ray Incorporated of California is one example of a treatment system that registers two x-ray images with corresponding DRR images when locating a tumor body in three-dimensional space. Aspects of this system are described in US Pub. No. 2011/0050692. Other useful applications for image registration include image guided treatment systems such as gantry based (isocentric) intensity modulated radiotherapy ("IMRT") systems and 3D conformal radiation treatments. Image registration processes according to the present disclosure are also useful in registering pre-operative 3D reference images (e.g., CT image data) or DRR images rendered from those 3D models with live 3D images (e.g., tomosynthetic CBCT or MVCT images) of the patient during an image-guided procedure.

Figure 7:
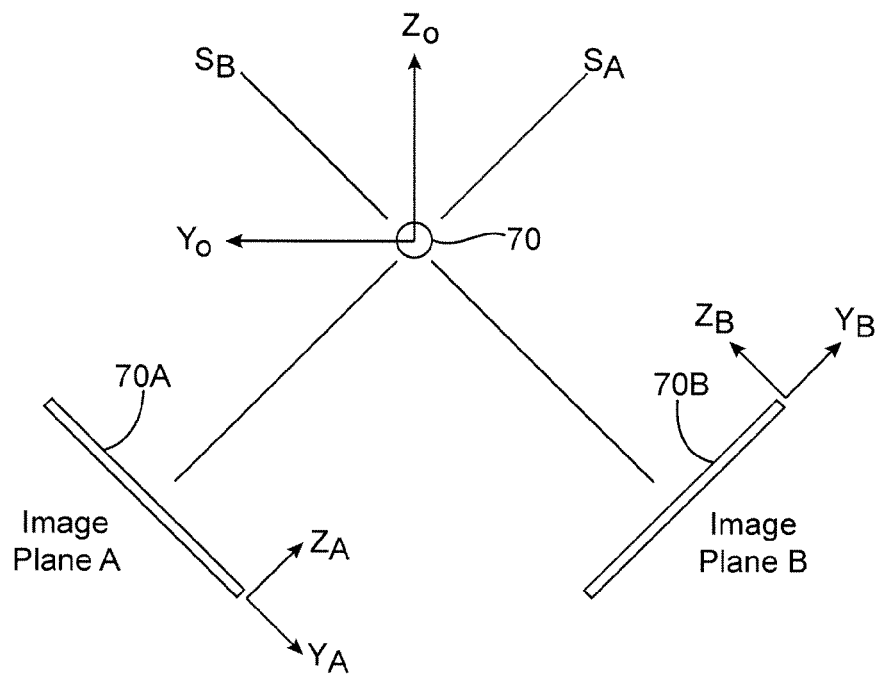
FIG. 7 illustrates a geometric relationship between a location of a target in three-dimensional space and two orthogonal projections of the target onto image planes.

FIG. 7 shows a geometric relationship between the location of a tumor body 70 in 3D space to two orthogonal projections of that tumor body onto images planes A and B. Planes A and B in FIG. 7 represent the orientation of x-ray images generated by x-ray sources $S_A$ and $S_B$, respectively. Using an image registration process according to the present disclosure DRR images registered with each of the live x-ray images in image planes A and B are used to track motion of the tumor body 70 in three-dimensional space.

The tumor body 70 location is expressed in terms of a coordinate system having axes Xo, Yo, and Zo with the coordinate system origin at the center of the tumor body 70. The location of the projection of tumor body 70 in the x-ray image planes A and B, i.e., tumor body 70A and 70B, respectively, in FIG. 7, is expressed in terms of coordinate systems Xa, Ya, and Za and Xb, Yb, and Zb as shown. Image planes A and B are oriented at +/−45 degrees to the Zo or Yo axes, although they may alternatively be oriented at any non-zero angle to these axes. The coordinate axes Xo, Xa and Xb, however, are all approximately parallel to each other (each extend normal to the paper) which imposes a constraint on the x-coordinate of the tumor location between the two x-ray images. Since the Xa and Xb axes are parallel to each other, the true x-coordinate for the tumor body must be the same for each image plane. This shared x-coordinate requirement may be exploited during the image registration process.

The shared x-coordinate requirement may be enforced after global similarity maps have been generated for each image plane, as a way to confirm the location of the tumor body or to resolve situations where there are no distinct maximums in one or both global similarity maps. A comparison of the Y-axis projections of the global similarity maps onto Z-X planes can be used to resolve these situations by choosing the x-coordinate where a maximum is found in both global similarity maps, or where the combined maps yield an x-coordinate having a distinct maximum.

Figure 8A:
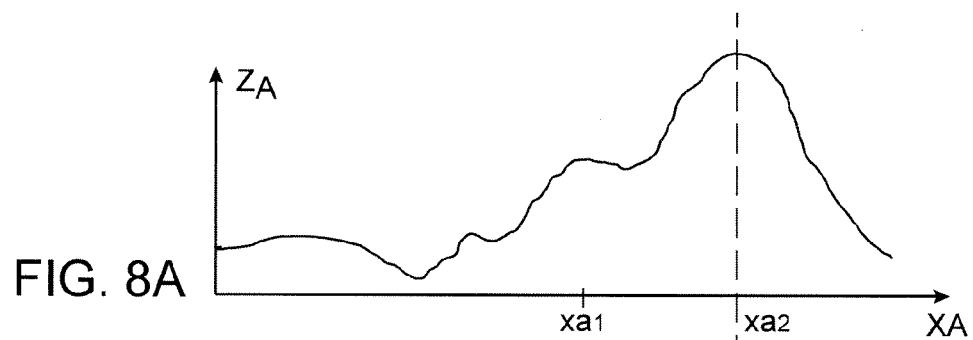
FIGS. 8A and 8B are graphs showing a projection of a global similarity map onto a plane for each of the two orthogonal image planes of FIG. 7. A shared axis constraint requirement for the image planes is used to confirm the location of the target in the two images.
Figure 8B:
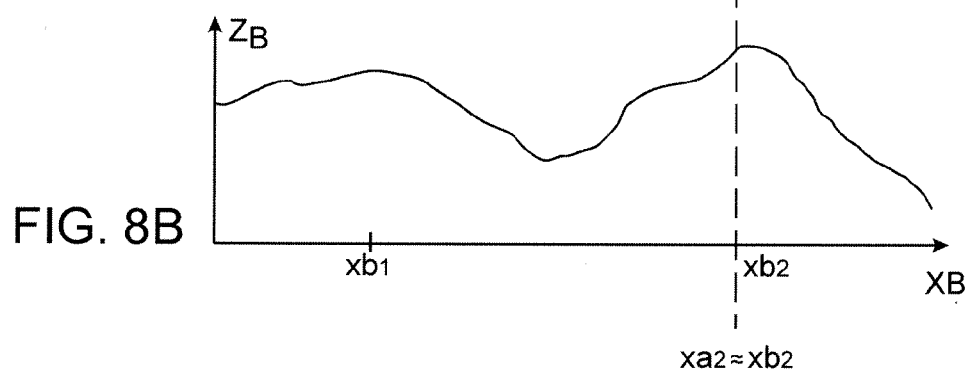

FIGS. 8A and 8B show Y-axis projections onto the Z-X planes for global similarity maps generated from image planes A and B, respectively. There are two maximums appearing in FIG. 8B, namely the maximums at x-coordinates xb1 and xb2. Since these template-level similarity values are very similar to each other, the actual tumor body location may be at either xb1 or xb2. FIG. 8A shows the x-coordinates for image plane A. Here there is a distinct maximum shown at xa2, but there alternatively may be two similar maximums at xa1 and xa2 as in the case of FIG. 8B. In either event, the ambiguity in x-coordinate location for the tumor body 70 can be resolved by choosing the x-coordinate where there is a maximum in both of the Y-axis projected maps, i.e., x-coordinates xb2, xa2. Alternatively, when there is no discernable maximum in either image, or no shared x-coordinate, a distinct maximum may be revealed from the combined maps. Thus, the true x-coordinate for the tumor body may be found from the sum of z-coordinates for the two maps.

The shared x-coordinate requirement may alternatively be enforced after only one of the global similarity maps has been generated. In this application the x-coordinate extracted from the global similarity map for one image plane (image plane A) is used to restrict the search space for the maximum similarity value in the other image plane (image plane B). Since the x-coordinate must be the same for both images, the candidate locations in image plane B can be limited to those that fall along the x-coordinate extracted from image plane A. Thus, the search for the tumor body in image plane B can amount to essentially a 1D search over y-coordinate values.

In view of the foregoing it will be appreciated that an image registration that takes into account a shared-axis constraint can be applied to other imaging geometries, and is not limited to the stereoscopic geometry illustrated in FIG. 7. Such other uses are contemplated, using either a search algorithm that computes similarity values according to the disclosure, or other image registration algorithms that seek to register multiple images where the image planes are arranged in such a manner as to impose one or more geometric constraints on the target's location in image planes.

A visual depiction of the global probability map may be made in terms of either a 3D contoured surface (FIG. 6) or as a two-dimensional plot with the distribution of template-level similarity values (TSV) differentiated by color. For example, the TSV distribution in the global probability map may be expressed in a manner analogous to a 2D thermal image, which displays different colors to reflect a temperature distribution. Thus, higher TSV are depicted using shades of orange and yellow, with shades of white (the "hot spots") corresponding to the maximum TSV. And lower TSV values may be depicted as shades of blue and black. A global probability map displayed in terms of different colors will hereinafter be referred to as a "thermal image of the TSV".

A thermal image of the TSV permits a visual comparison between the expected location for a structure (i.e., the maximum TSV or "hot spot") and the structure that appears at both the corresponding location and nearby locations in the 2D image, e.g., an x-ray. In contrast to, e.g., simply concluding that the maximum TSV corresponds to the target location, the visual comparison with the thermal image of the TSV facilitates a confidence measure when concluding that the target's actual location was found, or more quickly identifies situations where the maximum TSV should not be relied on to locate the target.

Using a computer monitor connected to a processor, an operator displays the 2D image (or selects a 2D view from a 3D image by rotating the image or moving along a coordinate axis in 3D space) of the patient on the monitor. The thermal image of the TSV is aligned with the 2D image. For example, when candidate locations are spaced by a pixel distance each pixel coordinate in the x-ray is aligned with the corresponding TSV color. A semi-transparent color is displayed so that both the x-ray and thermal image of the TSV can be seen at the same time on the monitor. This arrangement provides the operator with a visual display of the tracking region showing a distribution of colors over the grayscale x-ray image.

The operator searches for the hot spots and compares the hot spots to the underlying structure and nearby structure depicted in the x-ray. If the expected location of the target were to correspond to the actual location of the target, then the hot spot would appear on the x-ray at the same location of the target as the reference location chosen for the target in the reference image, e.g., the target's geometric center in the DRR. This type of visual comparison provides an additional confidence measure that the true location of the target was found. Conversely, if a hot spot does not match-up with the grayscale image expected at or nearby the hot spot, this may quickly indicate that the computed maximum TSV is not a reliable indicator of the target's location.

The methods described herein are not limited to use only with medical diagnostic imaging and treatment. In alternative embodiments, the methods and apparatus herein may be used in applications outside of the medical technology field, such as industrial imaging and non-destructive testing of materials (e.g., motor blocks in the automotive industry, airframes in the aviation industry, welds in the construction industry and drill cores in the petroleum industry) and seismic surveying. In such applications, for example, "treatment" may refer generally to the application of radiation beam(s).

The disclosure is intended to apply to computer software and/or hardware adapted for, in addition to methods of image registration. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (i.e., stores) information in a non-transient form accessible by a machine (e.g., a computer, network device, personal digital assistant, mobile device, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the claims should not be construed to limit the invention to the specific embodiments disclosed in the specification. Rather, the scope of the invention is to be determined entirely by the claims, which are to be construed in accordance with established doctrines of claim interpretation.

What is claimed is:

1. A method for identifying a structure within a patient image, comprising:
    generating a reference image from an image of the patient;
    generating a template from at least a portion of the reference image, the template comprising a set of patches;
    for each patch, generating a patch similarity map by computing a local similarity measure between the patient image and the patch for the template located at each of several candidate locations for the structure in the patient image;
    combining the patch similarity maps according to spatial relationships among the set of patches in the template to obtain a global similarity map; and
    identifying the structure from a template location in the patient image that corresponds to a maximum value for the global similarity map.

2. The method of claim 1, wherein each patch similarity map in the combining step is weighted in proportion to the relative significance of the image information in the patch.

3. The method of claim 1, wherein the local similarity measure is a maximum similarity value for a neighborhood of the patch's location in the patient image.

4. The method of claim 2, wherein a patch comprises pixels having values and the weighting is a standard deviation of the pixel values.

5. The method of claim 1, wherein the reference image is a Digitally Reconstructed Radiograph (DRR) and the generating a reference image step further includes
    generating a first DRR using all or part of the image of the patient,
    generating a second DRR using a smaller subset of the image than used for the first DRR;
    generating a first template from all or part of the first DRR, the first template comprising a set of candidate patches;
    generating a second template from all or part of the second DRR, the second template comprising a set of reference patches;
    calculating a similarity measure between each candidate patch and a corresponding reference patch; and
    using only those candidate patches satisfying a predetermined criteria for a similarity measure.

6. The method of claim 5, wherein the reference patches correspond to an immediate neighborhood of the structure in the image of the patient.

7. The method of claim 1, wherein the local similarity measure is normalized cross-correlation (NCC).

8. The method of claim 1, wherein each of the generating, combining and identifying steps is non-iterative.

9. The method of claim 1, further including generating a global similarity map for each of a plurality of patient images, where there is a known spatial relationship between the coordinates of at least a first image and a second image of the plurality of images,
    using the known spatial relationship to combine the global similarity maps to thereby produce a combined similarity map, and
    identifying the structure from a template location in the patient image that corresponds to a maximum value for the combined similarity map.

10. The method of claim 1, wherein the reference image is a Digitally Reconstructed Radiograph (DRR) generated from all or a part of a 3D image of the patient.

11. The method of claim 10, wherein the patient image is an x-ray and the DRR is generated from all or a part of a 3D image of the patient that was rendered from CT imaging data.

12. The method of claim 1, wherein the local similarity measure is a statistic of similarity values for a neighborhood of the patch's location in the patient image.

13. The method of claim 12, wherein the statistic is a function of a mean, average or higher order statistic of the similarity values for a neighborhood of the patch's location in the patient image.

14. The method of claim 1, further including a first image and a second image of a plurality of patient images that are spatially related such that a first coordinate location for the structure in at least the first and second images is the same,
    generating the global similarity map for the first image,
    extracting the first coordinate location for the structure from the global similarity map, and
    locating a second coordinate for the structure in the second image including computing similarity values in the second image for only those candidate locations that include the first coordinate location.

15. The method of claim 2, wherein the patch similarity maps are weighted in proportion to the relative significance of the image information in the patch then summed together according to the spatial relationships among the set of patches.

16. The method of claim 1, wherein the structure is a treatment target and/or a tracking target.

17. A method for identifying a structure within a patient image, comprising:
    generating a reference image from an image of the patient;
    generating a template from all or part of the reference image, the template comprising a set of patches;
    computing similarity values between the patient image and the template for the template located at each of several candidate locations for the structure in the patient image, wherein at each template location the similarity value is computed according to steps (a) and (b), as follows:
        (a) for each patch, computing a local similarity value for a neighborhood of the patch's location in the patient image, and
        (b) combining the local similarity values to obtain the similarity value at the template location; and
    identifying the structure in the patient image from a template location corresponding to a maximum of the similarity values.

18. The method of claim 17, further including the step of generating a global similarity map from the weighted similarity measures and then identifying the structure location from the global similarity map.

19. The method of claim 17, wherein the combining of local similarity values is a weighted sum of the local similarity values, wherein each local similarity value is weighted in proportion to the relative significance of the image information contained in the corresponding patch.

20. The method of claim 17, wherein the structure is a treatment target and/or a tracking target.

21. A non-transitory computer-readable medium having stored therein computer-readable instructions for a processor, wherein the instructions, when read and implemented by the processor, cause the processor to:
    generate a patch similarity map for each of a set of patches that form a template for a structure within a patient, wherein the template was generated from a reference image of the patient, and wherein the patch similarity map is generated by computing a local similarity measure between a patient image and the patch for the template located at each of several candidate locations for the structure in the patient image;

combine the patch similarity maps according to spatial relationships among the set of patches in the template to obtain a global similarity map; and identify the structure from a template location in the patient image that corresponds to a maximum value for the global similarity map.

22. The method of claim 21, wherein the patient image is an x-ray and the reference image was generated from all or a part of a 3D image of the patient that was rendered from CT imaging data.

23. The method of claim 21, wherein the structure is a treatment target and/or a tracking target.

24. A method for verifying an expected location for a target structure in a patient image, comprising:

computing similarity measures between the patient image and patches for the structure for each of a plurality of candidate locations for the structure in the patient image;

generating a global similarity map from the computed similarity measures, wherein a maximum of the computed similarity measures is an expected location for the structure in the patient image;

displaying the global similarity map with the patient image such that a similarity measure for each of the candidate locations is displayed with the corresponding location in the patient image; and visually comparing structure in the patient image against the similarity measures to verify that the expected location is the actual location of the target structure in the patient image.

25. The method of claim 24, wherein the computing step includes, for each patch, generating a patch-level similarity measure for each of the candidate locations and combining the patch-level similarity measures to form the global similarity map.

26. The method of claim 24, wherein the patient image is an x-ray and the global similarity map is a 2D color image distinguishing magnitudes of the similarity measures by color.

* * * * *